US007953381B2

(12) United States Patent
Suzuki

(10) Patent No.: US 7,953,381 B2
(45) Date of Patent: May 31, 2011

(54) RADIO RECEIVING APPARATUS FOR VEHICLE

(75) Inventor: Kensuke Suzuki, Nagoya (JP)

(73) Assignee: Denso Corporation, Kariya (JP)

( * ) Notice: Subject to any disclaimer, the term of this patent is extended or adjusted under 35 U.S.C. 154(b) by 760 days.

(21) Appl. No.: 11/987,037

(22) Filed: Nov. 27, 2007

(65) Prior Publication Data

US 2008/0125066 A1 May 29, 2008

(30) Foreign Application Priority Data

Nov. 29, 2006 (JP) ................................. 2006-321920

(51) Int. Cl.
*H04B 1/16* (2006.01)

(52) U.S. Cl. ................... 455/132; 455/166.2; 455/160.1

(58) Field of Classification Search .................. 455/132, 455/133, 134, 135, 150.1, 154.1, 160.1, 179.1, 455/140, 166.1, 166.2, 170.1
See application file for complete search history.

(56) References Cited

U.S. PATENT DOCUMENTS

| | | | | |
|---|---|---|---|---|
| 4,805,217 | A | 2/1989 | Morihiro et al. | |
| 2003/0035072 | A1 * | 2/2003 | Hagg | 348/729 |
| 2004/0171377 | A1 * | 9/2004 | Engstrom | 455/419 |
| 2005/0020223 | A1 * | 1/2005 | Ellis et al. | 455/186.1 |

FOREIGN PATENT DOCUMENTS

| | | | |
|---|---|---|---|
| DE | 43 04 179 A1 | | 8/1993 |
| DE | 43 43 901 A1 | | 6/1995 |
| DE | 103 31 157 A1 | | 1/2005 |
| JP | 04000773 | * | 7/1992 |
| JP | A-5-183392 | | 7/1993 |
| JP | A-5-314579 | | 11/1993 |
| JP | A-8-32466 | | 2/1996 |
| JP | A-10-215198 | | 8/1998 |
| JP | A-2003-110982 | | 4/2003 |
| JP | A-2004-235933 | | 8/2004 |

OTHER PUBLICATIONS

Office Action issued from the German Patent Office on Jul. 21, 2009 in the corresponding German patent application No. 10 2007 057 317.2-35 (and English translation).

Office Action dated Jul. 27, 2010 issued from the Japan Patent Office in the corresponding Japanese patent application No. 2006-321920 (and English translation).

* cited by examiner

*Primary Examiner* — Blane J Jackson
(74) *Attorney, Agent, or Firm* — Posz Law Group, PLC

(57) ABSTRACT

A radio receiving apparatus for a vehicle includes a radio receiver, a control circuit, a storage device, a manual switch. The radio receiver receives a radio broadcast signal at a predetermined reception frequency. The control circuit records sound information contained in the received broadcast signal on the storage device and plays back the recorded sound information from a predetermined playback position. The manual switch is used to manually change the reception frequency. The control circuit automatically changes the reception frequency when a predetermined condition is met. The control circuit determines whether the reception frequency is changed manually or automatically. When the reception frequency is manually changed, the control circuit sets the playback position to a position corresponding to when the change of the reception frequency is completed.

5 Claims, 4 Drawing Sheets

| MAIN TUNER | | SUB TUNER | | |
|---|---|---|---|---|
| STATION | FREQUENCY | STATION | FREQUENCY | PROGRAM |
| ST1 | F1 | ST3 | F3 | P1 |
| ST2 | F2 | ST4 | F4 | P2 |
| | | ST7 | F7 | |
| ST3 | F3 | ST1 | F1 | P1 |
| ST4 | F4 | ST2 | F2 | P2 |
| | | ST7 | F7 | |
| ST5 | F5 | ST6 | F6 | P3 |
| ⋮ | ⋮ | ⋮ | ⋮ | ⋮ |

RADIO RECEIVING APPARATUS FOR VEHICLE

CROSS REFERENCE TO RELATED APPLICATION

This application is based on and incorporates herein by reference Japanese Patent Application No. 2006-321920 filed on Nov. 29, 2006.

FIELD OF THE INVENTION

The present invention relates to an on-vehicle radio receiving apparatus that has a recoding function to record sound information contained in a received radio broadcast signal and a playback function to play back the recorded sound information at any time.

BACKGROUND OF THE INVENTION

As disclosed, for example, in U.S. Pat. No. 4,805,217 corresponding to JP-A-H5-31856, an on-vehicle radio receiving apparatus has been proposed that receives a radio broadcast signal and automatically records sound information contained in the broadcast signal on a memory. The recorded sound information can be played back at any time. Since a driver is focused on driving a vehicle, the driver may miss to catch important information contained in the radio broadcast signal. Such a radio receiving apparatus allows the driver to get the missed information later by playing back the recorded sound information.

Generally, when a radio station is changed, a reception frequency of a radio receiving apparatus is manually changed, for example, by tuning a tuning knob or pressing a preset button. As disclose, for example, in JP-A-H5-183392, an on-vehicle radio receiving apparatus has been proposed that has an network follow function that automatically changes a reception frequency in accordance with a strength of a received radio broadcast signal. The network follow function is described in detail below.

A radio broadcast signal has a limited transmission range. In radio broadcasting, therefore, radio stations are respectively distributed in regions to achieve nationwide coverage, and adjacent radio stations broadcast at different frequencies. When the same radio program is broadcast in a wide area, multiple radio stations located different regions broadcast the same radio program at different frequencies.

In the case of long-distance driving, when the radio receiving apparatus presently receives a radio program from a first radio station, the radio receiving apparatus may be able to receive the same radio program from a second radio station different from the first radio station. In such a case, if a first strength of a first radio broadcast signal received from the first radio station is less than a second strength of a second radio broadcast signal received from the second radio station, the network follow function causes the radio receiving apparatus to automatically switch from the first radio station to the second radio station.

In the conventional radio receiving apparatus having the recording function, when a radio station (i.e., reception frequency) is manually changed, a certain period of time is required to complete the change of the radio station. As a result, the recorded sound information probably has silence and noise. One approach to prevent the recorded sound information from having silence or noise is that the recording function is stopped whenever the radio station is changed. However, this approach results in an intermittent recorded sound. When the radio station is automatically changed by the network follow function, the change of the radio station is instantly completed so that the recorded sound does not has silence and noise. Therefore, in the case where the radio station is automatically changed, there is no need to stop the recording function.

SUMMARY OF THE INVENTION

In view of the above-described problem, it is an object of the present invention to provide an on-vehicle radio receiving apparatus that continues to record sound information contained in a received radio broadcast signal when a reception frequency is automatically changed and that plays back the recorded sound information without noise and silence caused when the reception frequency is manually changed.

A radio receiving apparatus for a vehicle includes a radio receiver, a storage device, a playback device, a manual switching device, an auto switching device, a determination device, and a playback position controller. The radio receiver receives a radio broadcast signal at a predetermined reception frequency. The storage device stores sound information contained in the received broadcast signal. The playback device plays back the stored sound information from a predetermined playback position. The manual switching device is used to manually change the reception frequency. The auto switching device automatically changes the reception frequency when a predetermined condition is met. The determination device determines whether the reception frequency is changed manually or automatically. The playback position controller sets the playback position.

When the determination device determines that the reception frequency is manually changed, the playback position controller sets the playback position to a position corresponding to when the change of the reception frequency is completed. Thus, even when silence and noise resulting from the manual change are stored in the storage device, the stored sound information can be played back without silence and noise.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENTS

First Embodiment

Figures 1, 2:
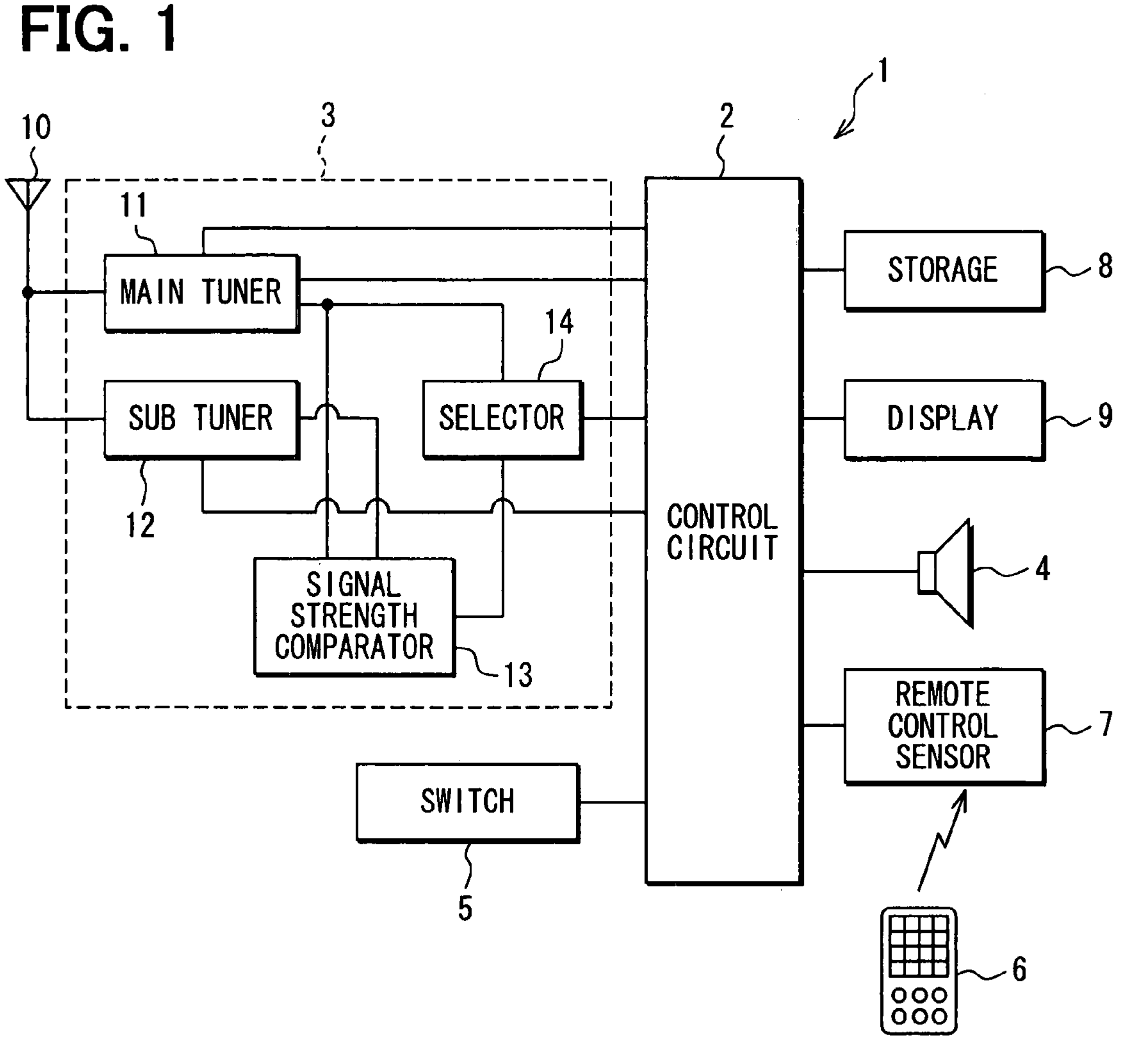
FIG. 1 is a block diagram illustrating a radio receiving apparatus according to a first embodiment of the present invention.
FIG. 2 is a diagram illustrating a mapping table that defines a mapping between radio stations, each of which broadcasts a common radio program.

Referring to FIG. 1, an on-vehicle radio receiving apparatus 1 according to a first embodiment of the present invention includes a control circuit 2, a radio receiver 3, a speaker 4, a control switch 5, a remote controller 6, a remote control sensor 7 for receiving a control signal from the remote controller 6, an external storage unit 8, and a display apparatus 9 such as a color liquid crystal display (LCD). The control circuit 2 is connected to the radio receiver 3, the speaker 4, the control switch 5, the remote control sensor 7, the external storage unit 8, and the display apparatus 9. In the present embodiment, the radio receiving apparatus 1 is built in a vehicle navigation system, and a road map for navigation is displayed on a screen of the display apparatus 9.

The control circuit 2 is a microcomputer and includes a central processing unit (CPU), a random access memory (RAM), and a read only memory (ROM), which are not shown in the drawings. The CPU, RAM, ROM are linked together through an internal bus. The control switch 5 includes a mechanical switch (not shown) installed on the periphery of the screen of the display apparatus 9 and a touch panel (not shown) installed on the screen of the display apparatus 9. A radio station can be selected through the control switch 5 or the remote controller 6. The external storage unit 8 may be, for example, a hard disk drive, a flash memory device, or the like.

The radio receiver 3 includes an antenna 10, a main tuner 11, a sub tuner 12, a signal strength comparator 13, and a selector 14. The main tuner 11 receives a radio broadcast signal that is broadcast by a radio station corresponding to a reception frequency selected through the control switch 5 or the remote controller 6. Also, the main tuner 11 can continuously change the reception frequency and locks on a frequency having a signal strength exceeding a predetermined value. Thus, the main tuner 11 can automatically find an available radio station in response to a auto scan command inputted through the control switch 5 or the remote controller 6.

The radio receiving apparatus 1 has an network follow function such that the sub tuner 12 automatically receives the same radio program as the main tuner 11 receives. In this case, the main and sub tuners 11, 12 receive the same radio program from different radio stations. In other words, the main and sub tuners 11, 12 receive the same radio program at different frequencies.

Specifically, the control circuit 2 stores a mapping table shown in FIG. 2. The mapping table may be, for example, stored in the ROM of the control circuit 2. The mapping table defines a mapping between a first radio station and at least one second radio station that broadcasts the same program as the first station broadcasts. In short, the mapping table defines a mapping between a first frequency of the first radio station and at least one second frequency of the second radio station.

For example, as shown in FIG. 2, a radio station ST1 is mapped with a radio station ST3. The radio stations ST1, ST3 broadcast a common radio program P1 at frequencies F1, F3, respectively. When the main tuner 11 receives the radio program P1 from the radio station ST1, which is selected through by the control switch 5 or the remote controller 6, the control circuit 2 reads the frequency F3 of the radio station ST3 from the mapping table and provides the frequency F3 to the sub tuner 12. Then, the sub tuner 12 is automatically tuned to the frequency F3 and receives the radio program P1 from the radio station ST3. Thus, both the main tuner 11 and the sub tuner 12 receive the radio program P1 at the respective frequencies F1, F3.

One radio station can be mapped with multiple radio stations, each of which broadcasts the same radio program as the one radio station broadcasts. For example, in the case of FIG. 2, a radio station ST2 is mapped with two radio stations ST4, ST7, i.e., a frequency F2 of the radio station ST2 is mapped with frequencies F4, F7 of the radio stations ST4, ST7. The control circuit 2 sequentially and repeatedly provides the frequencies F4, F7 to the sub tuner 12 at regular intervals.

The signal strength comparator 13 compares a strength of a radio broadcast signal received by the main tuner 11 with a strength of a radio broadcast signal received by the sub tuner 12. When the signal strength comparator 13 determines that the strength of the radio broadcast signal received by the sub tuner 12 is greater than the strength of the radio broadcast signal received by the main tuner 11, the selector 14 instructs the main tuner 11 so that the main tuner 11 is tuned to a reception frequency of the sub tuner 12.

Alternatively, the network follow function may operate as follows. The sub tuner 12 performs auto scan tuning to find an available radio station. The control circuit 2 determined, based on the mapping table, whether a radio program broadcast by the found radio station is the same as a radio program broadcast by a radio station selected by the main tuner 11. When the control circuit 2 determines that the radio program broadcast by the found radio station is the same as the radio program broadcast by the radio station selected by the main tuner 11, the signal strength comparator 13 compares a strength of a radio broadcast signal received by the main tuner 11 with a strength of a radio broadcast signal received by the sub tuner 12.

Because of the network follow function, the main tuner 11 can receive a radio broadcast signal having a maximum signal level at any place. The radio broadcast signal is transmitted to the control circuit 2 and outputted as sound from the speaker 4. At the same time, the control circuit 2 records the radio broadcast signal as sound information on the external storage unit 8. When the radio broadcast signal is an analog signal, the radio broadcast signal is converted (i.e., digitalized) into the sound information and then recorded on the external storage unit 8. In contrast, when the radio broadcast signal is a digital signal, the radio broadcast signal is directly (i.e., without conversion) recorded on the external storage unit 8.

The external storage unit 8 has a predetermined storage capacity. For example, the external storage unit 8 can store the sound information corresponding to 60 minutes of the radio program. When the external storage unit 8 becomes full, the recorded sound information is deleted in order from the oldest. Thus, the external storage unit 8 stores the sound information corresponding to the latest 60 minutes of the radio program.

The recorded sound information can be played back by using the control switch 5 or the remote controller 6. When a play back operation is performed, the control circuit 2 reads the latest recorded sound information of a predetermined period of time from the external storage unit 8. For example, the control circuit 2 reads the latest recorded sound information of five minutes from the external storage unit 8. The control circuit 2 converts the read sound information into the radio broadcast signal (i.e., analog signal) and outputs the radio broadcast signal as sound from the speaker 4.

Figure 5:
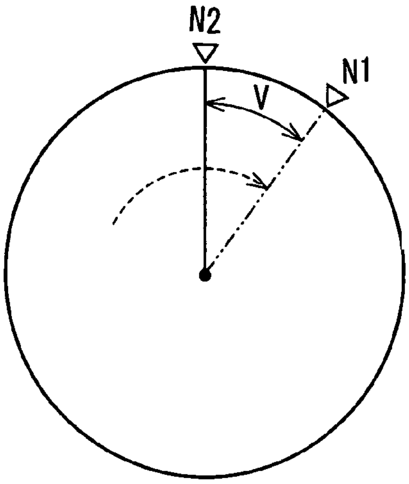
FIG. 5 is a diagram illustrating a playback start position of a recorded sound information.

The recorded sound information is read based on a memory address of the external storage unit 8. In FIG. 5, N1 represents a present address where the sound information is stored just before the playback operation is performed, and N2 represents a playback address from which the sound information is played back in response to the playback operation. The sound information is stored in a direction indicated by a broken arrow in FIG. 5. For example, when sound information corresponding to the latest five minutes of the radio program is played back, the playback address is determined as follows. In FIG. 5, V represents a storage capacity required to store sound information corresponding to five minutes of the radio program. When the playback operation is performed, the control circuit 2 calculates the playback address Av based on the present address and the storage capacity V. The sound information is sequentially read from the calculated playback address and outputted as sound from the speaker 4.

When an user manually changes the radio station (i.e., reception frequency of the main tuner 11) by operating a tuning knob or a preset button of the control switch 5 or the remote controller 6, noise and silence can be recorded on the external storage unit 8 together with the sound information. Therefore, when the sound information is played back, the noise and silence are also played back. The played-back noise and silence make the user uncomfortable.

The radio receiving apparatus 1 according to the present embodiment prevents the noise and silence from being played back, even when the noise and silence are recorded on the external storage unit 8 due to the fact that the reception frequency of the main tuner 11 is manually changed.

Figure 3:
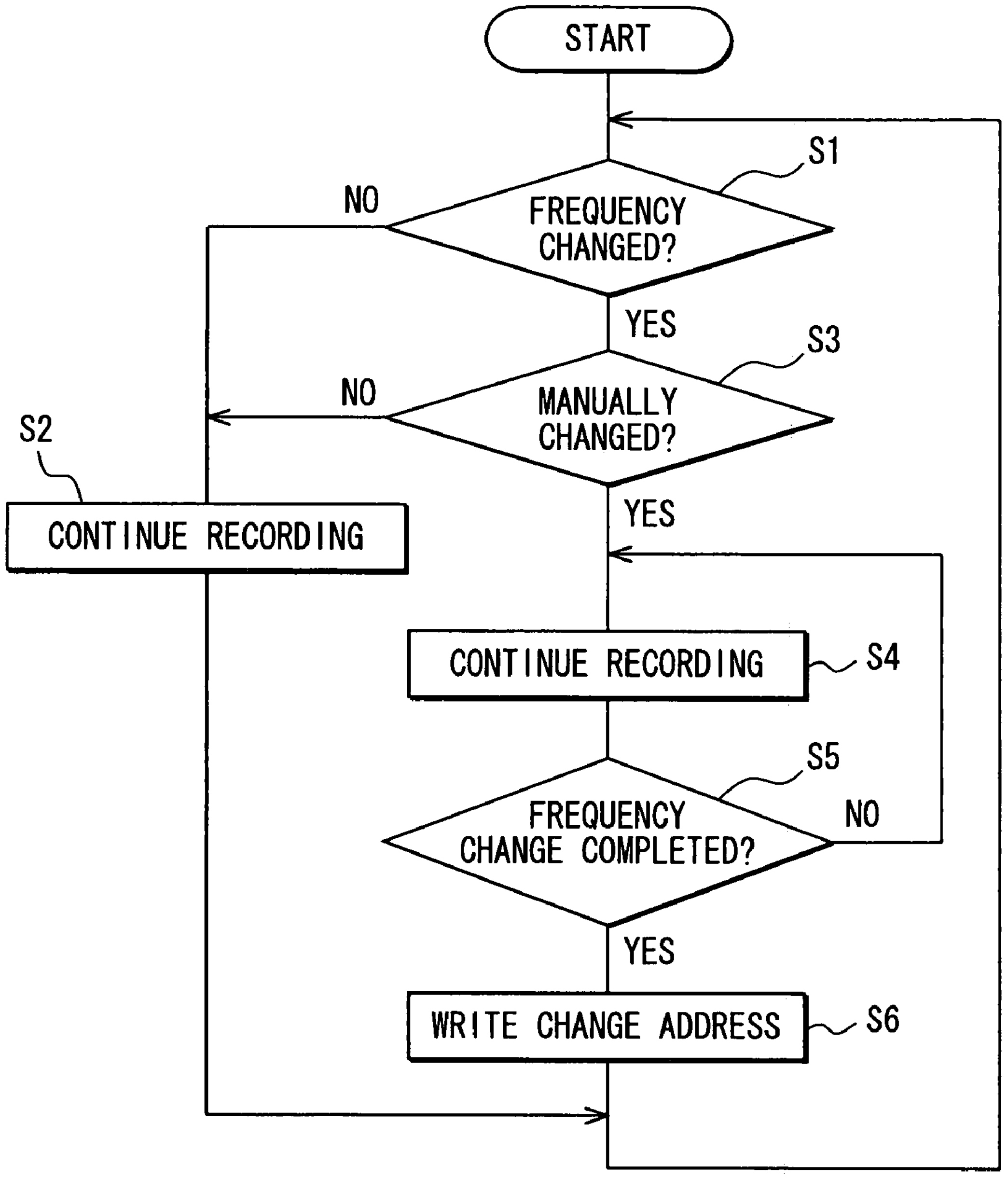
FIG. 3 is a flow diagram illustrating a recording process of the radio receiving apparatus.

The recording of the sound information contained in the radio broadcast signal is performed in accordance with a recording process illustrated by a flow chart of FIG. 3.

When the radio receiving apparatus 1 is powered on, the radio receiver 3 starts receiving a radio broadcast signal from a radio station. While the radio broadcast signal is received by the radio receiver 3, the control circuit 2 outputs sound information contained in the received radio broadcast signal from the speaker 4. At the same time, the control circuit 2 starts recording the sound information on the external storage unit 8. Unless a reception frequency of the main tuner 11 is changed, corresponding to NO at S1, the recording is continued so that the control circuit 2 sequentially records the sound information on the external storage unit 8.

The reception frequency of the main tuner 11 is manually changed through the control switch 5 or the remote controller 6, when the user listens to another radio program, for example. Further, as described above, the reception frequency of the main tuner 11 is automatically changed, when the strength of the radio broadcast signal received by the sub tuner 12 is greater than the strength of the radio broadcast signal received by the main tuner 11.

When the reception frequency of the main tuner 11 is changed, corresponding to YES at S1, the control circuit 2 determines whether the reception frequency of the main tuner 11 is changed manually or automatically. If the control circuit 2 determines that the reception frequency of the main tuner 11 is changed manually, corresponding to YES at S3, the recording of the sound information on the external storage unit 8 is continued. If the control circuit 2 determines that the reception frequency of the main tuner 11 is changed automatically, corresponding to NO at S3, the recording of the sound information on the external storage unit 8 is continued. Therefore, the recording of the sound information on the external storage unit 8 is continued regardless of whether the reception frequency of the main tuner 11 is changed manually or automatically.

In the case where the reception frequency of the main tuner 11 is changed automatically, corresponding to NO at S3, the reception frequency is instantly changed based on the mapping table shown in FIG. 2. Therefore, although the recording of the sound information on the external storage unit 8 is continued, noise and silence are not recorded on the external storage unit 8. Thus, the recording of the sound information on the external storage unit 8 can be seamlessly performed. As a result, when the recorded sound information is played back, sound outputted from the speaker 4 has no silent and noise.

In contrast, in the case where the reception frequency of the main tuner 11 is changed manually, corresponding to YES at S3, a certain period of time is required to complete the change of the reception frequency. When the change of the reception frequency is completed, corresponding to YES at S5, the control circuit 2 writes a change address to the external storage unit 8. The change address represents an address where the sound information is recorded on the external storage unit 8 just after the change of the reception frequency is completed. Alternatively, the change address may be written to another memory device (not shown) and loaded into the control circuit 2 when the sound information is played back.

Figure 4:
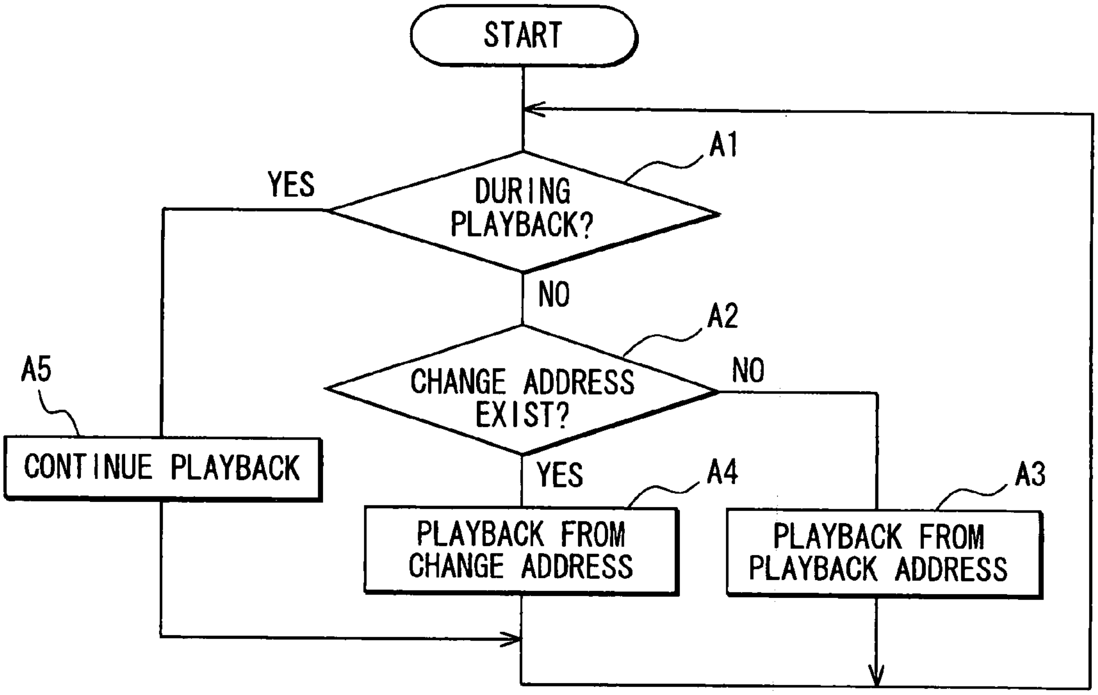
FIG. 4 is a flow diagram illustrating a playback process of the radio receiving apparatus.

The playback of the sound information recorded on the external storage unit 8 is performed in accordance with a playback process illustrated by a flowchart of FIG. 4.

If an user is focused on driving a vehicle, the user may miss to catch a portion of a radio program. In such a case, the user can listen the missed portion of the radio program by playing back the sound information recorded on the external storage unit 8. When the playback operation is performed, for example, by pressing a playback button of the control switch 5 or the remote controller 6, the control circuit 2 determines whether the playback is being performed now.

When the control circuit 2 determines that the playback is being performed now, correspond to YES at A1, the playback is continued. In contrast, when the control circuit 2 determines that the playback is not being performed now, correspond to NO at A1, the control circuit 2 determines whether the change address exists between the present address and the playback address. As described previously, the sound information is recorded at the present address just before the playback operation is performed. The sound information is recorded at the playback address a certain period of time (e.g., five minutes) before the playback operation is performed.

When the control circuit 2 determines that the change address does not exist between the present address and the playback address, corresponding to NO at A2, the control circuit 2 plays back the recorded sound information from the playback address so that the user can listen the sound information stored between the present address and the playback address.

In contrast, when the control circuit 2 determines that the change address exists between the present address and the playback address, corresponding to YES at A2, the control circuit 2 plays back the recorded sound information from the change address so that the user can listen the sound information stored between the present address and the change address. As a result, sound outputted from the speaker 4 does not include silence and noise due to the manual change of the reception frequency of the main tuner 11. The recording process illustrated by FIG. 3 is continued, even after the playback operation is pressed, and the playback process illustrated by FIG. 4 is performed.

According to the present embodiment, the sound information contained in the radio broadcast signal received by the main tuner 11 can be seamlessly recorded on the external storage unit 8, regardless of whether the reception frequency of the main tuner 11 is changed or not. Therefore, even when the user misses to catch the portion of the radio program, the user can listen to the missed portion later at any time.

When the reception frequency of the main tuner 11 is automatically changed, for example, by means of the network follow function, the recorded sound information is played back from the playback address. Thus, the user can listen all the recorded sound information. In contrast, when the reception frequency of the main tuner 11 is manually changed through the control switch 5 or the remote controller 6, the recorded sound information is played back from the change address. Thus, sound outputted from the speaker 4 does not have silence and noise, although the silence and noise are recorded on the external storage unit 8.

Second Embodiment

Figure 6:
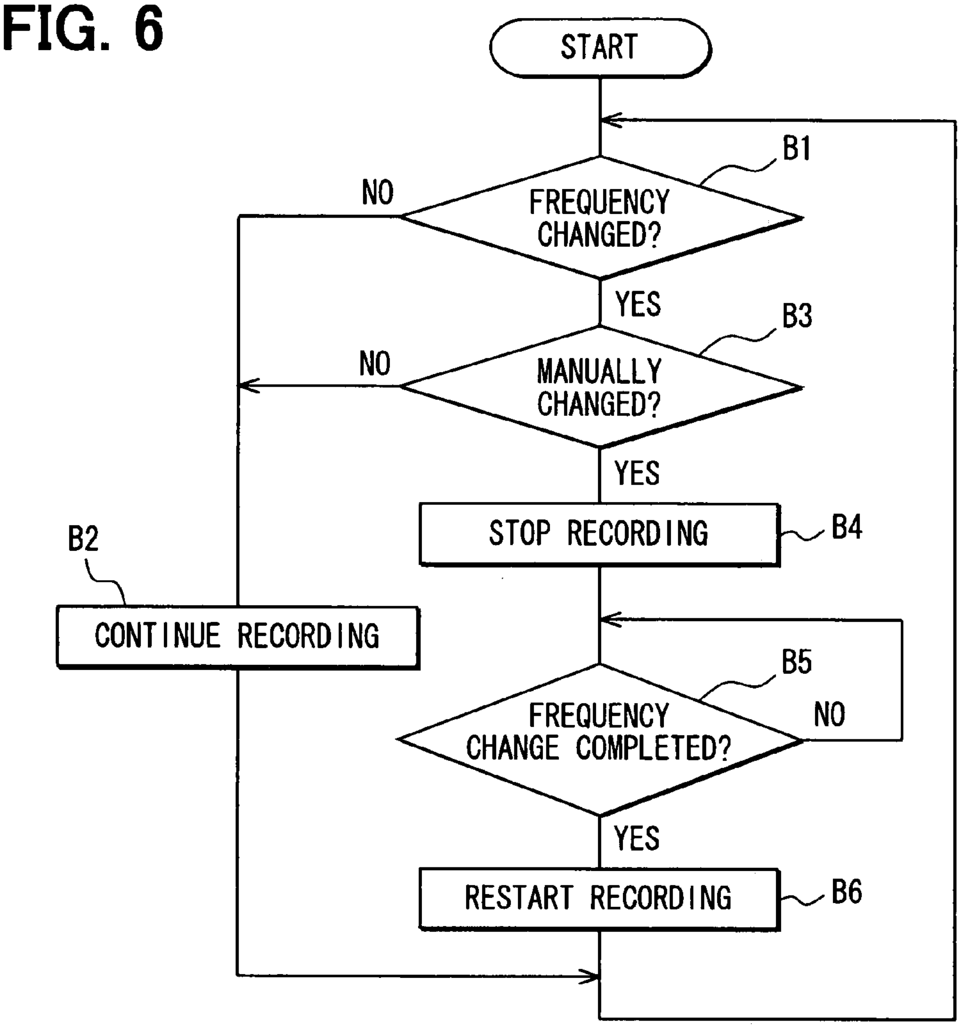
FIG. 6 is a flow diagram illustrating a recording process according to a second embodiment of the present invention.

A second embodiment of the present invention is described below with reference to FIGS. 6, 7. Differences between the first and second embodiments are as follows.

In the second embodiment, when the reception frequency of the main tuner 11 is manually changed, the recording of the sound information is stopped until the change of the reception frequency is completed. Specifically, as shown in FIG. 6, when the reception frequency of the main tuner 11 is manually changed, corresponding to YES at B3, the control circuit 2 stops recording the sound information. Then, the change of the reception frequency of the main tuner 11 is completed, corresponding to YES at B5, the control circuit 2 restarts recording the sound information.

Figure 7:
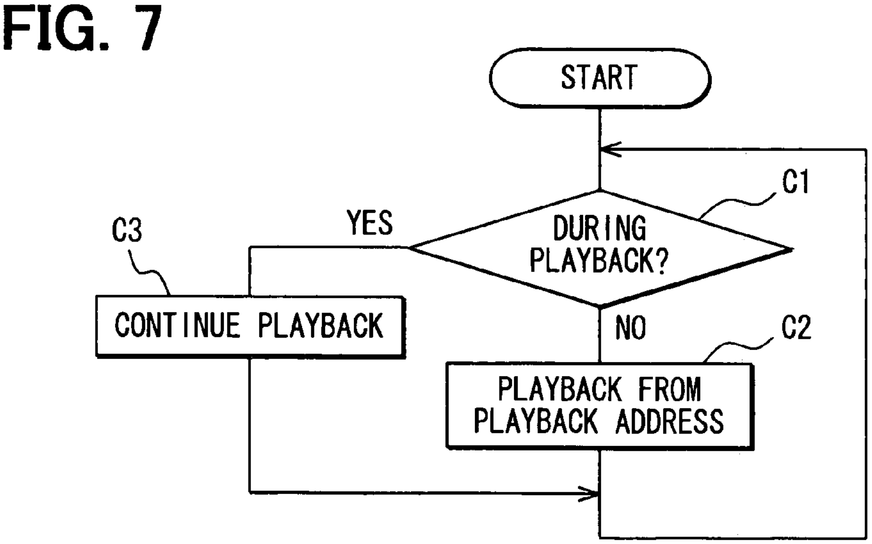
FIG. 7 is a flow diagram illustrating a playback process according to the second embodiment.

Then, as shown in FIG. 7, when the playback operation is performed, the control circuit 2 plays back the recorded sound information from the playback address. Thus, the sound information stored between the playback address and the present address is played back.

(Modifications)

The embodiments described above may be modified in various ways. For example, the reception frequency of the main tuner 11 can be automatically changed by a function other than the network follow function. For example, when a radio program presently received by the main tuner 11 is interrupted by an interrupt signal from another radio program where traffic information or disaster information is available, the main tuner 11 can be automatically tuned to a frequency of a radio station broadcasting the other radio program. Thus, the reception frequency of the main tuner 11 can be automatically changed when a predetermined condition is met.

The signal strength comparator 13, the selector 14 can be incorporated in the control circuit 2. The display apparatus 9 can inform an user that the reception frequency of the main tuner 11 is automatically changed. The radio receiving apparatus 1 can be provided as a single unit without being built in a vehicle navigation system or can be built in a system other than the vehicle navigation system. Such changes and modifications are to be understood as being within the scope of the present invention as defined by the appended claims.

What is claimed is:

1. A radio receiving apparatus for a vehicle comprising:

a radio receiver for receiving a radio broadcast signal at a predetermined reception frequency;

a storage device for storing sound information contained in the received broadcast signal;

a playback device for playing back the stored sound information from a predetermined playback position;

a manual switching device for manually changing the reception frequency;

an auto switching device for automatically changing the reception frequency when a predetermined condition is met;

a determination device for determining whether the reception frequency is changed, the determination device determining whether the change of the reception frequency is caused by the manual switching device or by the auto switching device upon determination that the reception frequency is changed;

a storage controller for causing the storage device to continue storing the sound information when the determination device determines that the reception frequency is changed by the auto switching device, and a playback position controller for setting the playback position, wherein when the determination device determines that the reception frequency is changed by the manual switching device, the playback position controller sets the playback position to a position corresponding to when the change of the reception frequency is completed.

2. A radio receiving apparatus for a vehicle comprising:

a radio receiver for receiving a radio broadcast signal at a predetermined reception frequency;

a storage device for storing sound information contained in the received broadcast signal;

a playback device for playing back the stored sound information from a predetermined playback position;

a manual switching device for manually changing the reception frequency;

an auto switching device for automatically changing the reception frequency when a predetermined condition is met;

a determination device for determining whether the reception frequency is changed, the determination device determining whether the change of the reception frequency is caused by the manual switching device or by the auto switching device upon determination that the reception frequency is changed; and a stop device for causing the storage device to stop storing the sound information when the determination device determines that the reception frequency is changed by the manual switching device.

3. The radio receiving apparatus according to claim 2, wherein the stop device causes the storage device to restart storing the sound information, when the change of the first reception frequency is completed.

4. A radio receiving apparatus for a vehicle comprising:

a radio receiver including a first tuner for receiving a first radio broadcast signal at a first reception frequency;

a storage device for storing sound information contained in the received first broadcast signal;

a manual switch configured to manually change the first reception frequency; and a control circuit that includes a recording section, a playback section, an auto switching section, a determination section, and a playback position control section, wherein the recording section records the sound information on the storage device, wherein the playback section plays back the stored sound information from a predetermined playback position, wherein the auto switching section automatically changes the first reception frequency when a predetermined condition is met, wherein the determination section determines whether the reception frequency is changed and determines whether the change of the reception frequency is caused manually or automatically upon determination that the reception frequency is changed, wherein when the determination section determines that the reception frequency is changed by the manual switch, the recording section continues recording the sound information on the storage device, and wherein when the determination section determines that the reception frequency is changed by the manual switch, the playback position control section sets the playback position to a position corresponding to when the change of the first reception frequency is completed.

5. The radio receiving apparatus according to claim 4, wherein the radio receiver further includes a second tuner for receiving a second radio broadcast signal at a second reception frequency, the second radio broadcast signal containing the same sound information as the first radio broadcast signal contains, wherein the radio receiver further includes a signal comparator for comparing a first strength of the received first broadcast signal with a second strength of the received second broadcast signal, and wherein when the second strength is greater than the first strength, the condition is met so that the first tuner is automatically tuned to the second reception frequency.

* * * * *